Jan. 19, 1932.　　　E. W. JOHNSON　　　1,841,955

SHOCK ABSORBER

Filed April 24, 1928

INVENTOR

UNITED STATES PATENT OFFICE

ERNEST WILLIAM JOHNSON, OF LONDON, ENGLAND, ASSIGNOR OF ONE-HALF TO COLIN DEFRIES, OF HOVE, ENGLAND

SHOCK ABSORBER

Application filed April 24, 1928, Serial No. 272,389, and in Great Britain September 10, 1927.

This invention is for improvements in or relating to shock absorbers, more particularly intended for vehicles, of the type comprising a vane and a cooperating abutment enclosed in a casing forming a main working chamber, and a conduit extending from the pressure space between the vane and abutment and controlled by an automatic valve which is situated in a part of the mechanism which does not move relatively to the casing during the shock absorbing operations, and which always precludes passage of the liquid from the said space through the conduit, but permits passage of the liquid into such space through the conduit when the pressure in said space is relaxed. The invention has for one of its objects to provide a compact and simple construction of shock absorber which can be readily adjusted according to requirements and which shall not be liable to develop air pockets in the working chamber.

According to the invention there is provided a shock absorber of the type above described wherein means reaching to the exterior of the casing are provided for adjusting said non-return valve to vary the freedom with which liquid can pass into the pressure space or to preclude passage in such direction also. Thus, instead of the non-return valve affording a free path for the working liquid on the return movement of the vane, it may be arranged to provide only a strangulated path or to close that path altogether, in which latter case the vane will meet with the same amount of resistance to its movement in both directions. Consequently, the shock-absorber can be readily set to suit any circumstances without necessitating its dismantling.

The vane may be made without any conduit through it connecting its opposite sides. This will be found to be of advantage when the present invention is embodied in a shock-absorber of the character described in my United States Patent No. 1,578,319 dated March 30, 1926.

Conveniently, the aforesaid non-return valve is situated in the abutment and the conduit it controls leads from one side to the other of the abutment. In addition to the conduit controlled by the non-return valve, the abutment may also have formed in it a second valve-controlled conduit permitting flow of the working liquid from either side to the other of the abutment, or from one side only to the other, but restricting such flow to the degree required to secure the requisite damping effect of the shock-absorber, and the valve of this second conduit may also have combined with it means reaching to the exterior of the casing for adjusting its setting.

In carrying out the present invention the two conduits may have separate orifices on that side of the abutment from which liquid can flow past the non-return valve, but have one or more orifices common to them on the other side of the abutment, and the said second conduit be of a tortuous character or be provided with a non-return valve working in the direction opposite to that in which the non-return valve in the other conduit works. By making this second conduit of a tortuous character or providing it with a non-return valve as specified, the vane will be given ample opportunity to create the necessary vacuum to suck in the liquid from the recuperator chamber, and thus prevent the formation of air-pockets.

It is also a feature of the invention to provide an improved packing for the bearing in the casing which receives the hub carrying the vane. According to this feature of the invention, there is provided a ring of cotton and graphite, leather or other suitable material which is of C cross-section and is so arranged that the opening of the C is directed towards the interior of the working chamber, while the said bearing is formed with liquid conduits leading to the said opening in the C. This will permit the pressure in the working chamber to expand the C against the walls of its housing and prevent leakage.

An embodiment of the invention will now be described, by way of example only, with the aid of the accompanying drawings in which:—

Like reference numerals indicate like parts throughout all the figures of the drawings.

Figure 1:
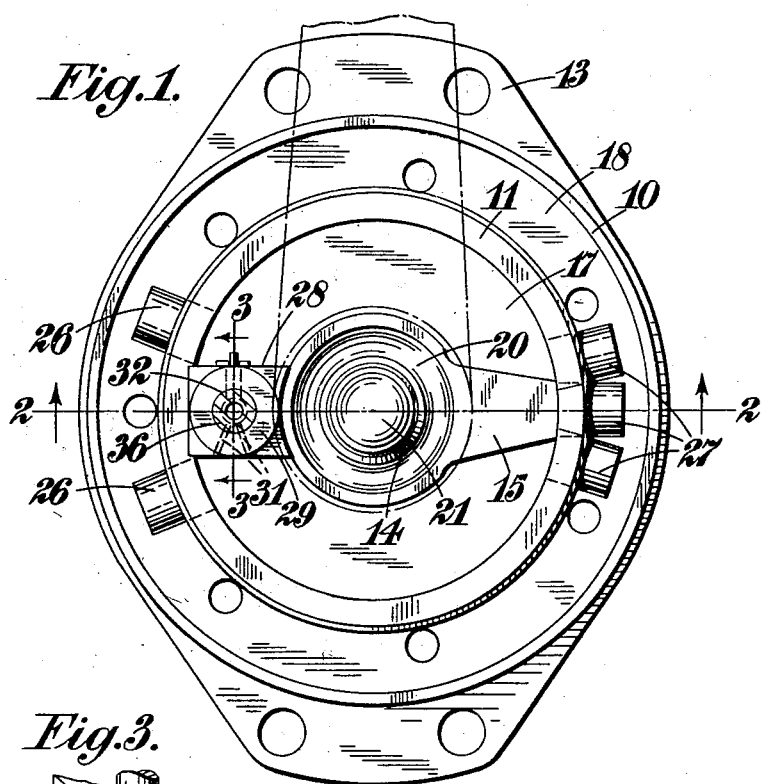
Figure 1 shows a shock absorber according to the invention with its cover removed.
Figure 3:
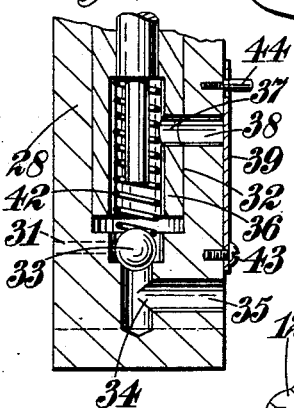
Figure 3 is a fragmentary cross-section to a larger scale along the line 3—3 of Figure 1.
Figure 2:
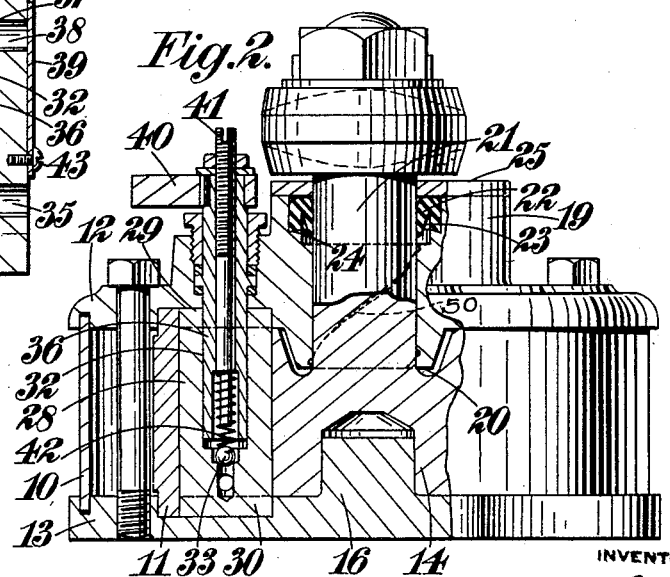
Figure 2 shows the shock absorber partly in cross-section along the line 2—2 of Figure 1.

The construction illustrated in the drawings is on the same general lines as is described and illustrated in the aforesaid prior specification and is mounted on the vehicle with the air release conduits on top and the line 2—2 vertical. There are two concentric tubular members 10 and 11 held between end plates 12 and 13, and a hub 14 which is formed integral with a vane 15 and is centered upon a boss 16 formed integral with the lower end plate. In this way the working and recuperator chambers 17 and 18 are formed. The upper end plate 12 has a boss 19 which reaches into a circular groove 20 in the upper face of the hub 14 to form a well for assisting in preventing leakage. The said boss also increases the length of the bearing for the hub spindle 21 without increasing the overall height of the casing. Beyond this well the hub spindle 21 reaches upwardly to the exterior of the upper plate, its bearing in the latter being packed by the aforesaid C ring 22 which has its opening 23 downwardly directed.

This ring is received in a circular recess 24 surrounding the hub spindle and is secured in place by a plate 25 mounted on the upper face of the upper main end plate 12. The bearing in the main end plate is scored or grooved at 50 between the aforesaid well and the recess for the C ring to permit the working liquid to be forced into the opening of the C and expand it against the spindle 21 and against the side of its housing 24. There are two valve-controlled air release conduits 26 communicating between the working chamber 17 and the recuperator chamber 18 and three liquid supply conduits 27 which are relatively staggered transversely of the shock-absorber. The air release conduits and the liquid supply conduits are preferably constructed as described and illustrated in the aforesaid prior patent and as their construction and operation are well known in the art it is thought that further description is unnecessary. The abutment 28 is of substantially the same general outline as is illustrated in the earlier specification, but it has on its ends circular projections 29 and 30 to reach into recesses in the end plates. In one face the abutment has two similar circular orifices 31, which are located at the same level and which lead to near the lower end of a central bore 32 in the abutment. This bore 32 reaches right to the top of the abutment, but does not reach to the bottom thereof. Just below the level of the two orifices 31 the bore forms a seat for a ball valve 33 (i. e. the aforesaid non-return valve) below which a conduit 34 extends and bends towards an aperture 35 in the second face of the abutment. These orifices, whether one or two are employed, should be such as to offer at least the same total cross-sectional area as the conduit 34 below the ball valve, and the arrangements specified have the advantage over a single circular orifice that it will be impossible for the ball valve 33 to be lifted from its seat into a position to close completely the orifice or orifices. The said aperture 35 in the second face of the abutment is the one from which the liquid has, in certain settings of the parts, a free path past the ball valve 33 to the first side of the abutment. Located above the ball valve 33 is a rotatable sleeve 36 which occupies the bore 32 in the abutment and projects through the upper end plate 12 to the exterior. This sleeve is perforated at 37 at a level opposite to another conduit 38 which leads to the second side of the abutment, its orifice in the latter being controlled, if desired, by the aforesaid flap valve 39. The perforation is elongated so that rotation of the sleeve will vary the available aperture. If the flap valve 39 is omitted, liquid can pass in both directions between the opposite sides of the abutment through the perforation in the sleeve and through the interior of the sleeve and above the ball valve, but if the flap valve is present, liquid can only pass along the said path from the first to the second side of the abutment. The sleeve 36 is provided at its upper end with a lever 40 whereby it may be adjusted and inside the sleeve there is located a rod 41 which reaches through the upper end of the sleeve and can be screwed up and down therein. The lower end of the rod is shouldered and is surrounded by a spring 42 which bears against the shoulder and against the ball valve 33. The rod can be screwed up or down to vary the pressure of the spring upon the ball valve or it can be screwed right down so as to hold the ball hard upon its seating by a metal-to-metal contact.

The aforesaid flap valve 39 may take the form of a thin spring plate, secured at one end to the abutment at 43 and guided by a pin 44 at its other end so as to move into and out of closing position over the orifice to which it is appropriated. Its resilience tends to maintain it in closing position but it readily permits liquid to pass from the first to the second side of the abutment though precluding its passage in the opposite direction, thus ensuring the creation of the necessary vacuum to draw in from the recuperator chamber any fresh supplies of liquid required. It may not always be found necessary to employ the flap valve as the other arrangements specified above may be ample to prevent the occurrence of air pockets.

The operation of the device is as follows: When the wheel of the vehicle meets a bump in the road the vane 15 will be turned counter-clockwise, as shown in Figure 1, compressing the liquid in the working chamber 17 on one side of the abutment and causing the non-return valve 33 to lift and allow the liquid to pass through the conduit 35, 34, 31 to the other side of the abutment. After the wheel has passed the bump, the vehicle springs will cause it to move downwards, thereby turning the vane 15 clockwise. The liquid will then pass back through the conduit 31, 38 but as this conduit is restricted by the valve 36, considerable resistance is offered to the passage of the liquid through it. The downwards movement of the wheel is thus retarded and rebound avoided. It will be understood that the movement of the wheel into a hole in the road will be retarded in the same way while upwards movement of the wheel when the other side of the hole is reached will not be damped. When a sudden movement is given to the wheel its upwards movement should be free as described above, but if the vehicle is travelling over a wavy road there in a tendency for the vehicle to pitch and to prevent this the shock absorber should act both ways. The movement of the vane 15, due to a wavy road will be slow and the rise of pressure in working chamber 17 small. By adjusting the rod 41 the spring 42 can be tensioned so that the valve 33 will not lift unless a rise of pressure occurs which is greater than would be caused by a wavy road so that the shock absorber would be double acting. This rise in pressure is relatively small compared to the rise in pressure caused by a sudden movement of the wheel so that the device will still act practically in one direction only when a sudden movement occurs.

From the foregoing it will be seen that the shock absorber can be adjusted, without dismantling, so as to vary the damping action which it gives or to convert it from having free movement in one direction to being double-acting.

It is to be understood that the invention is not restricted to the precise constructional details set forth.

I claim:

1. A shock absorber comprising a casing constituting a main working chamber for the reception of a working liquid, a vane and a cooperating abutment enclosed in said casing, a conduit extending through the abutment from one side to the other, a non-return valve comprising a valve member and a spring, situated in the abutment and controlling the said conduit in such manner as always to preclude passage of the liquid through the conduit from the pressure space between the vane and abutment, a second conduit in said abutment permitting flow of the working liquid from said pressure space, a rotary perforated sleeve controlling the second conduit and restricting the flow of liquid therethrough to the degree required to secure the requisite damping effect of the shock absorber, said non-return valve member and spring for the first conduit being located on the axis of the sleeve, a rod lying inside the sleeve but reaching to the exterior of the casing and forming an abutment for the spring and adjustable to vary the load exerted by the spring on the valve member and to press the valve member on its seating if desired, and means reaching to the exterior of the casing for adjusting the setting of said perforated sleeve, for the purpose specified.

2. A shock absorber comprising a casing constituting a main working chamber for the reception of a working liquid, a vane and a cooperating abutment enclosed in said casing, a conduit extending through the abutment from one side to the other, a valve member situated in the conduit, a spring pressing said valve member against its seating so as always to preclude passage of the liquid through the conduit from the pressure space between the vane and abutment, means reaching to the exterior of the casing for adjusting the pressure exerted by the spring on the valve member to vary the freedom with which liquid can pass into the pressure space, a second conduit in said abutment, a valve controlling said second conduit and restricting the flow of liquid therethrough to the degree required to secure the requisite damping effect of the shock absorber, means reaching to the exterior of the casing for adjusting the setting of said second valve, and a third valve of the non-return type also controlling the second conduit and precluding the passage of liquid therethrough to the pressure space but allowing liquid to pass from said space, for the purpose specified.

3. A shock absorber comprising a casing constituting a main working chamber for the reception of a working liquid, a vane and a cooperating abutment enclosed in said casing, a conduit extending through the abutment from one side to the other and formed with a valve seating, a valve member situated in the conduit, a spring pressing the valve member against the seating so as always to preclude passage of the liquid through the conduit from the pressure space between the vane and abutment but not necessarily to preclude passage of the liquid into such space through the conduit when the pressure in the said space is relaxed, means reaching to the exterior of the casing for adjusting the tension in the spring to vary the freedom with which liquid can pass into the pressure space, a second conduit in said abutment, a valve controlling said second conduit and restricting the flow of liquid therethrough to the degree required to secure the requisite damping effect of the shock absorber, means reaching to the exterior of the casing for adjusting the setting of said second valve, and a non-return flat valve mounted on the face of the abutment in the working chamber so as to preclude the passage of liquid through the second conduit to the pressure space but to allow liquid to pass from said space, for the purpose specified.

4. A shock absorber comprising a casing constituting a main working chamber for the reception of a working liquid, a vane enclosed in said casing, a hub on said vane, a bearing in said casing for the hub, a packing ring of C cross-section in said bearing, the opening of the C being directed towards the interior of the working chamber, liquid conduits in said bearing leading to the said opening in the C, a cooperating abutment also enclosed in said casing, two conduits extending through a part of the mechanism which does not move relatively to the casing, from the pressure space between the vane and abutment, a valve in one of said conduits, a seating for said valve, a spring pressing said valve into the seating so as to preclude passage of the liquid from the said pressure space through the conduit, means reaching to the exterior of the casing for adjusting the load exerted by said spring in the valve to vary the freedom with which liquid can pass into the pressure space or to preclude passage in such direction also, and a second valve which remains in set position for controlling passage of the liquid through the other said conduit, for the purpose specified.

In testimony whereof I affix my signature.

ERNEST WILLIAM JOHNSON.